US008197257B2

(12) United States Patent
Clewis

(10) Patent No.: US 8,197,257 B2

(45) Date of Patent: Jun. 12, 2012

(54) DUAL SWING BREACH TRAINING SYSTEM

(76) Inventor: Brandon H. Clewis, Pittsboro, NC (US)

(*) Notice: Subject to any disclaimer, the term of this patent is extended or adjusted under 35 U.S.C. 154(b) by 246 days.

(21) Appl. No.: 12/759,343

(22) Filed: Apr. 13, 2010

(65) Prior Publication Data

US 2011/0247274 A1 Oct. 13, 2011

(51) Int. Cl.
*G09B 19/00* (2006.01)

(52) U.S. Cl. ........................................................ 434/226

(58) Field of Classification Search .................. 434/219, 434/226, 247, 258; 49/381, 394, 504; 292/163, 292/219, 240, 241, 261

See application file for complete search history.

(56) References Cited

U.S. PATENT DOCUMENTS

| | | | | |
|---|---|---|---|---|
| 5,906,493 A | 5/1999 | Bishop | | |
| 6,877,988 B2 | 4/2005 | Phillips et al. | | |
| 7,611,356 B1 | 11/2009 | Bishop | | |
| 7,967,326 B2 * | 6/2011 | Klementowicz et al. | ..... | 280/656 |
| 7,972,139 B2 * | 7/2011 | Staub | ..... | 434/226 |
| 2005/0050816 A1 | 3/2005 | Manning et al. | | |
| 2006/0240391 A1 | 10/2006 | Sovine et al. | | |
| 2008/0014564 A1 * | 1/2008 | Allen | ..... | 434/226 |
| 2009/0208914 A1 | 8/2009 | Phillips et al. | | |
| 2009/0215014 A1 * | 8/2009 | Walker | ..... | 434/226 |

OTHER PUBLICATIONS

Military Operation on Urban Terrain (MOUT) Combined Arms Collective Training Facility (CACTF); JFHQ-IA-TS-PO Military Operations in Urbanized Terrain (MOUT) Standing Operating Procedures (SOP) Nov. 1, 2007.

* cited by examiner

*Primary Examiner* — Kurt Fernstrom

(74) *Attorney, Agent, or Firm* — Olive & Olive, P.A.

(57) ABSTRACT

A dual-swing breach training system is provided that includes a door having a removable strike plate therein and a removable means for adjustably securing the door and the doorframe in a coaxial position, that is readily removable to meet various training needs. A base for the system that does not obstruct access to the door during training is also provided.

17 Claims, 4 Drawing Sheets

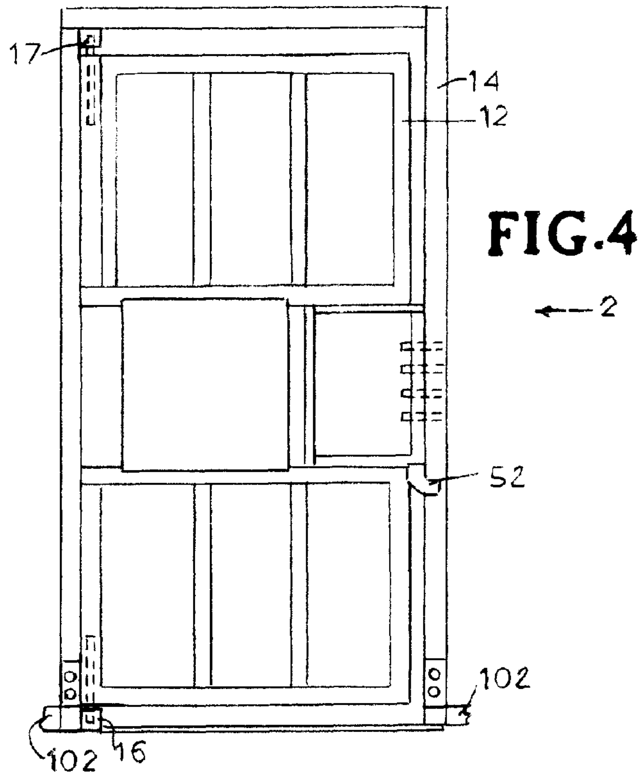
FIG.4
FIG. 5
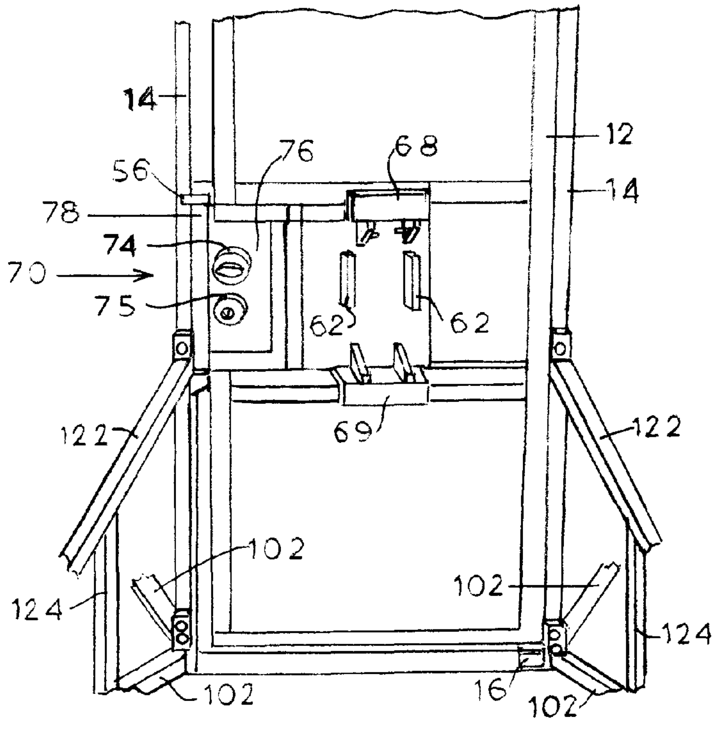

DUAL SWING BREACH TRAINING SYSTEM

CROSS REFERENCE TO RELATED APPLICATIONS

Not applicable.

STATEMENT REGARDING FEDERAL SPONSORED RESEARCH OR DEVELOPMENT

Not applicable.

FIELD OF THE INVENTION

The present invention relates to training devices for public safety officials and those training to become public safety officials who may be required to forcibly enter through doorways. More specifically, the present invention relates to training devices that allow public safety officials and trainees to practice door breaches under a variety of different scenarios.

BACKGROUND OF THE INVENTION

Public safety personnel, e.g. fire fighters, police, sheriffs, military, are often faced with the need to perform forced entry through doorways. A forced entry can be, and often is, a life-threatening situation, where a hesitation could mean the difference between life and death. Every second counts. It is critical that these public safety personnel know how to enter a structure quickly and safely before they are put on the front lines where there is no room for error.

In the past, forced entry training was performed using conventional doors and doorframes. While the training was very realistic, it was quite expensive due to the cost of constant replenishment of doors. Because of the expense, many training facilities limit door breach training to a minimum.

Manufacturers have developed doors that could be used repeatedly to practice breach training. However, use of these doors by training facilities has drawbacks, which continue to prevent their widespread use. For example, the doors are generally made for one type of breach only, e.g. ballistic, ramming, or pry breaches. As such, the training facilities are forced to buy multiple doors to meet various real-world situations that might be encountered during service.

It would serve those who perform emergency or law-enforcement related door breaching operations to provide doors that could be used for breach-training that are reusable and which demonstrate various types of breaches, thus eliminating the expense involved in purchasing multiple training doors.

SUMMARY OF THE INVENTION

The present invention replicates those scenarios trainees encounter when performing various types of breaches, in a cost effective manner. Trainees may utilize the invention for breach training using ballistics, ramming, and prying techniques without the need to purchase additional doors. The difficulty and type of breach being replicated is fully adjustable.

These and other benefits are recognized by the system of the invention, which in one embodiment comprises a dual-swing door adapted for engagement with a removable strike plate and a base attached to the doorframe that does not obstruct access to the front of the door. The system further includes a pair of hinge systems adapted to allow inward and outward swinging of the door and a removable means for adjustably securing the door and the doorframe in a coaxial position.

In another embodiment of the invention, the removable means for adjustably securing the door and the doorframe in a coaxial position comprises a first insert removably attached to the door and a second insert removably attached to the doorframe and at least one of a plurality of dowels inserted there through for adjustably restraining the door.

In a further embodiment of the invention, the removable means for adjustably securing the door and doorframe in a coaxial position comprises a first insert attached to the door and a second insert attached to the doorframe and a locking mechanism adapted to be engaged by the inserts to restrain movement of the door.

DETAILED DESCRIPTION OF THE DRAWINGS

FIG. 4 is a front elevation view of an alternative embodiment of the invention;

FIG. 5 is a fragmentary, pictorial view of one embodiment of the base of the invention;

DETAILED DESCRIPTION OF THE INVENTION

Figure 1:
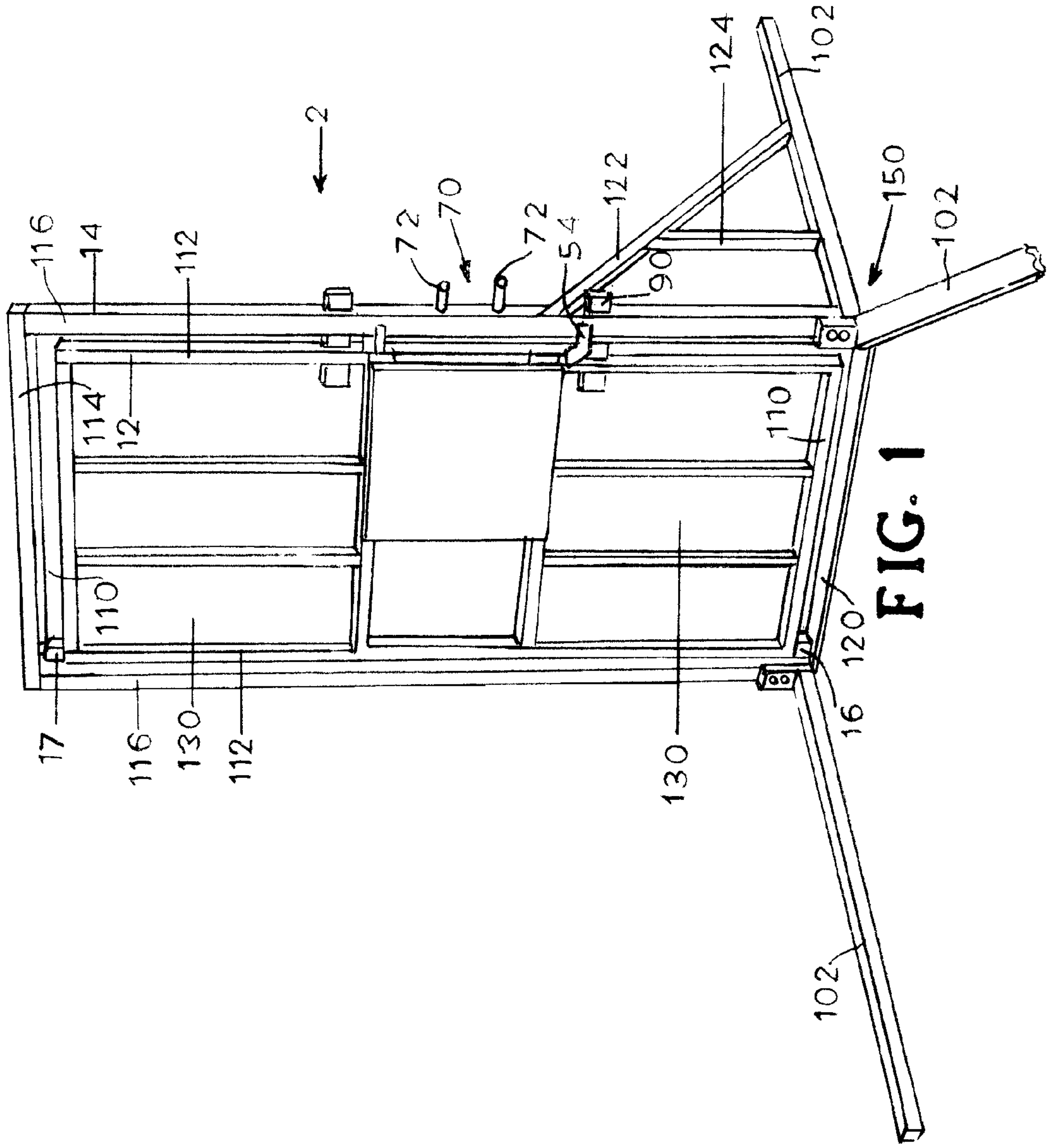
FIG. 1 is a front pictorial view of one embodiment of the invention.

The present invention is a dual-swing breach training system that replicates scenarios encountered when performing an actual door breach. The system addresses several major problems associated with door breach training. The first problem is the expense incurred because of the purchase of realistic doors that are destroyed after every training breach. The second is the expense incurred because of the purchase of multiple breach training doors because of the variety of doors being used by the public, e.g. outward swinging doors, inward swinging doors. As used herein, "inward swinging" and "inward direction" refer to the swinging of the door on the side of the system and direction into which the door would function if it were an actual door. Similarly, "outward swinging" and "outward direction" refer to the swinging of the door on the opposite side of the system and direction into which the door would function if it were an actual door. The invention dual-swing breach training system allows law enforcement officials to train just as they would during a real forced-entry situation because it will respond just as a real door would respond upon all types of forcible entry, including ballistic, ram, or prying types of entries. The amount of force required to break through the door is adjustable, as well as the swing of the door.

With reference to the Figures, an embodiment of the novel dual-swing breach training system 2 is illustrated. The breach training system 2 comprises door 12, doorframe 14, base 150, a pair of hinges 16, 17, and a removable means 70 for adjustably securing door 12 and doorframe 14 in a coaxial position positioned between door 12 and doorframe 14. With specific reference to FIGS. 1 and 3-5, door 12 has a solid perimeter that includes at least one aperture therein for engagement with a removable and slidable strike plate 60. At least one other aperture 50 is included for retaining removeable means 70 for securing door 12 in a coaxial position with doorframe 14. The solid perimeter of door 12 includes a pair of cross members 110 and pair of side members 112 connects in a rectangular configuration. At least one of the side members 112 includes a pair of apertures therein for engagement with hinges 16, 17.

Turning to FIGS. 1 and 4, in specific embodiments of the invention, door 12 comprises cutouts 130. Cutouts 130 are areas of door 12 that are defined by open spaces having solid perimeters. Cutouts 130 allow a trainee to practice breaching different types of doors because various materials to simulate different breaching situations can fill them in. For example, the embodiment of the system 2 illustrated in FIG. 1 shows door 12 having six cutouts 130. Cutouts 130 are filled with wooded slabs to simulate a wooden door. If a trainee is interested in training on steel doors, the cutouts could be filled with steel slabs. Any appropriate fillings could be used, including, for example, fiberglass, vinyl, glass, plastic or stone. Any number, size and shape cutout 130 is appropriate for use in the invention. For example, FIG. 5 shows door 12 with only two large wooden cutouts. Door 12 may also comprise no cutouts 130.

Doorframe 14 includes a pair of side beams 116 and a cross beam 114 connecting the two side beams 116. Doorframe 14 includes a holder 52 for at least one means for securing door 12 in a coaxial position with doorframe 14.

Figure 2:
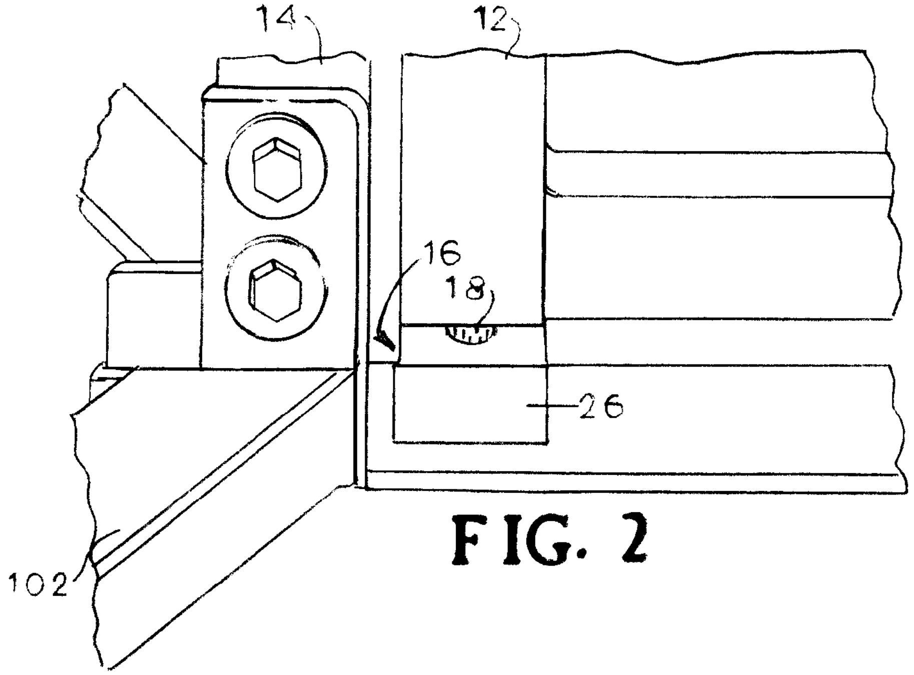
FIG. 2 is an enlarged, fragmentary view of a dual-swing socket of the invention.
Figure 3:
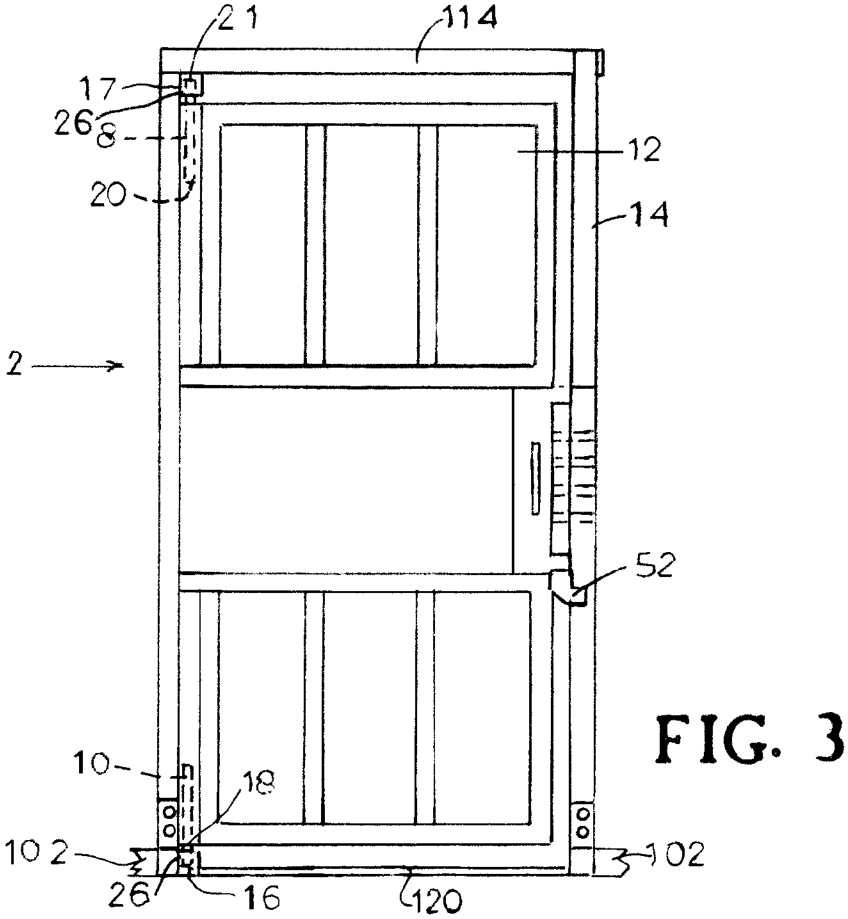
FIG. 3 is a rear elevation view of one embodiment of the invention.

With reference to FIG. 2, hinges 16, 17 (not shown in FIG. 2) of the invention each comprise a rod 18 that has two ends 20, 21, and a socket 26. The purpose of hinges 16, 17 is to allow door 12 to swing inward and outward, which allows the door to be compromised in both directions. The socket 26 may be any socket that comprises a hole therein for engagement of rod 18. As shown in FIG. 3, socket 26 of hinge 17 is permanently attached to the cross beam 114 of doorframe 14 such that it may readily engage rod 18. Likewise, socket 26 of hinge 16 is permanently attached to central member 120 of base 150 such that it may readily engage rod 18.

The location of hinges 16, 17 is key because it allows trainees to practice breaches using a standard size door. Some prior art devices have doors that are shorter or narrower than what is standard because of placement of the door hinge inside the doorframe. The door must be cut to allow it to swing within the doorframe.

The means of attachment of socket 26 to either doorframe 14 or central member 120 may be by any known attachment means, including, but not limited to welding, nuts and bolts, screws, or other fasteners. In a specific embodiment, socket 26 is welded to base 150, which stabilizes the system 2 during use. In alternative embodiments, socket 26 is attached to base 150 using a pair of angle brackets and removable bolts, thereby facilitating disassembly and transport of the system of the system 2. The first rod end 20 is partially inserted within apertures 8, 10 of doorframe 14, while the other end 21 is engaged within socket 26.

In a more specific embodiment, hinge 16 comprises rod 18, having a 1⅛" diameter and socket 26 is 2¼" square and includes a cylindrical hole therein having about a 1⅛" diameter for engagement with a portion of rod 18.

Rod 18 is not removable and remains in constant contact with door 12 and doorframe 14. Prior art devices have placed hinges inside the doorframe, which has resulted in decreased door size. In addition, the hinges' position within the doorframe limits the range of rotation of the door within the frame, limiting use of door 12 to either inward swinging or outward swinging. The present breach training system 2, allows door 12 to swing in an inward and outward direction, thus reducing the number of doors necessary for training purposes. Hinge 16 allows door 12 to essentially pivot about the socket, and does not limit the horizontal range of motion of door 12. Hinge 16 may be bullet proof, explosive proof, or fire proof in alternative embodiments of the invention. In specific embodiments of the invention, hinge 16 is of steel construction, which is impervious to bullets, explosives, and force.

Breach training system 2 may be used to simulate forced door entries, repeatedly without the necessity to purchase a new door after it has been breached. Simulated breaches include those accomplished with the use of rams, pry bars, explosives, Haligan tools, fire, and other techniques.

Figure 6:
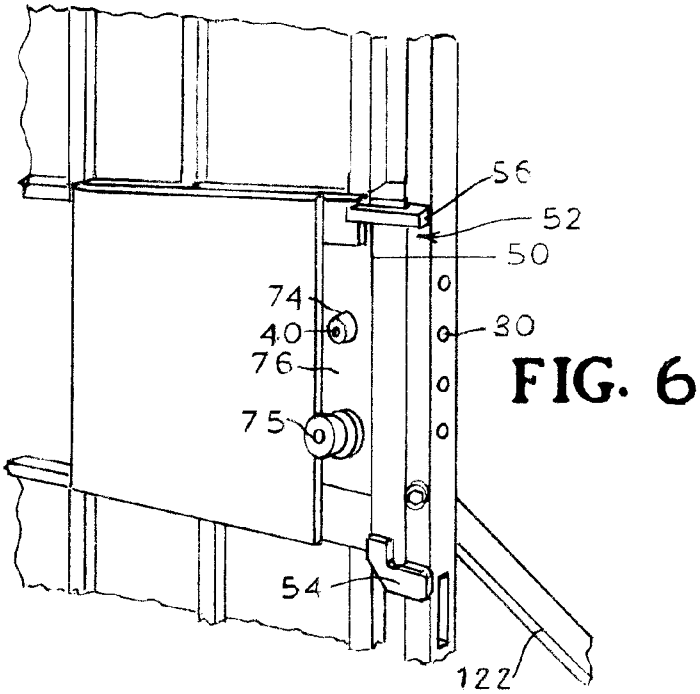
FIG. 6 is an enlarged, fragmentary view of one embodiment of the front of the strike plate of the invention.
Figure 7:
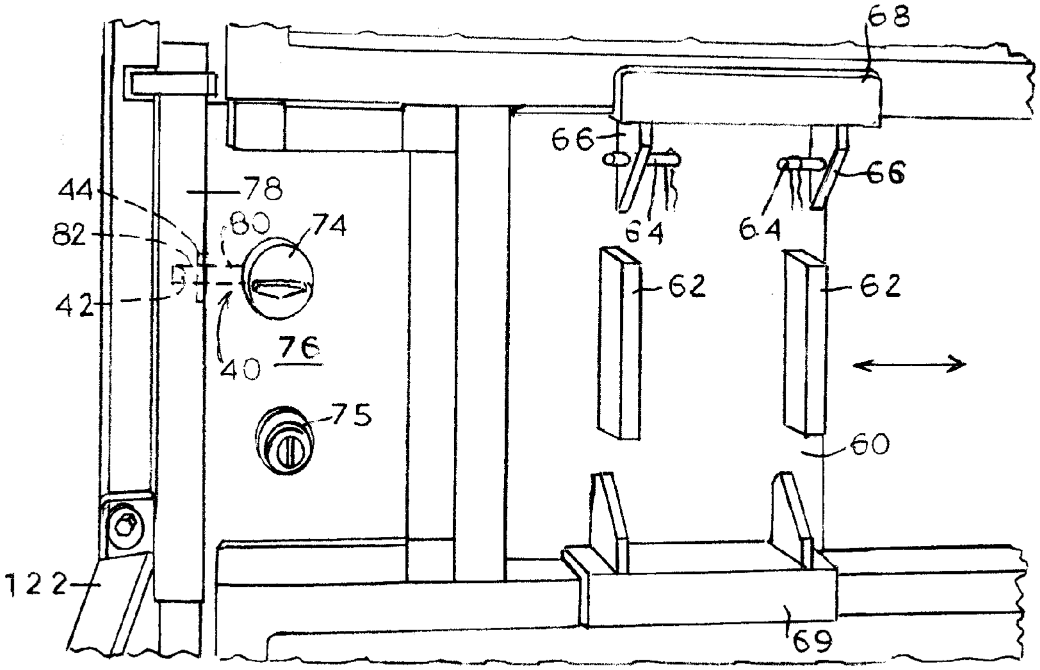
FIG. 7 is an exploded view of one embodiment of the back of the strike plate of the invention.

Breach training system 2 is versatile enough to simulate many types of door breaches. This is accomplished by allowing the use of a removable, slideable strike plate 60 within door 12. While the use of strike plates is not novel, the strike plate 60 is reversible allowing for training from all sides. Strike plate 60 is also slidable, allowing the trainee to chose when to employ it. With reference to FIGS. 6 and 7, strike plate 60 is reversible and removable and may be made out of any desired material. Examples include steel, wood, glass, etc. Strike plate 60 may be made of any material capable of maintaining structural integrity during use. In one embodiment, strike plate 60 comprises steel. Strike plate 60 may also be of any thickness that allows maintenance of structural integrity during use.

In the specific embodiment illustrated in FIG. 7, strike plate 60 is ¾ inches thick and is comprised of steel. In that particular embodiment, strike plate 60 comprises pins 64 and a means 66 for holding pins 64. Door 12 comprises a brace 68 for removable engagement with pins 64. To assemble breach training system 2, pins 64 must be engaged by brace 68. A second brace 69 further aids the removable attachment of strike plate 60 to door 12. Second brace 69 is permanently fixed onto strike plate 60 and is adapted to engage door 12 as shown in FIGS. 6 and 7. Attachment of strike plate 60 to the door 12 in this manner allows forcible entry ballistic training. Prior art devices that use strike plates that are bolted onto both the front and the back of doors prevent shooting of the strike plate during training. The breach training system 2 described herein allows ballistic and prying as means for breaching door 12.

Strike plate 60 may also comprise handles 62 to enable ease of removal.

Breach training system 2 also includes a removable means 70 for adjustably securing door 12 and doorframe 14 in a coaxial position. Removable means 70 is positioned between door 12 and doorframe 14 and allows trainees to practice all types of breaches, including prying, in both an inward and outward direction. Means 70 is removable and in the embodiment depicted in FIG. 1, comprises dowels 72, which in some embodiments may be standard wooden dowels, that extend through the vertical plane that separates door 12 from doorframe 14. In this particular embodiment, removable means 70 also comprises two inserts 76, 78, which may be of any size and shape capable of retaining door 12 and doorframe 14 in a coaxial position after dowels 72 have been inserted there through. In specific embodiments, the first insert 76 is a 2"×8" piece of wood that is removably attached to door 12 and the second insert 78, is a 2"×4" piece of wood that is removably attached to doorframe 14. It should be understood by those of skill in the art that inserts comprising other materials, for example metals, may also be used in specific embodiments without departing from the spirit and scope of the system 2. Inserts 76, 78 are removably secured to door 12 and doorframe 14, respectively. Insert 76 is secured to door 12 within aperture 50, which is adapted to be of a sufficient size and shape necessary to retain insert 76 by pressure. In other words, insert 76 must be slightly larger than the inside dimensions of aperture 50 to allow it to be retained therein, using pressure alone. It should be understood by those of skill in the art, however that the use of additional attachment means, like nuts and bolts, may be employed without departing from the spirit and scope of the invention. Holder 52 secures insert 78 to doorframe 14.

Holder 52 may be any device capable of securing insert 78 to doorframe 14. In the specific embodiment of the invention depicted in FIG. 1, holder 52 comprises a bottom member 54 for engagement with the lower portion of insert 78 and an upper member 56 that encircles the upper portion of insert 78. Bottom member 54 and upper member 56 are independently attached to doorframe 14. The attachment may be permanent or removable. Members 54, 56 may be attached to doorframe 14 by welding, screwing, using nuts and bolds, or any other known attachment technique.

In the embodiment of the invention depicted in FIGS. 1 and 6, dowels 72 extend from one 2"×8" wooden insert 76, which is in removable contact with door 12 to a 2"×4" insert 78, which is in contact with doorframe 14. Engagement of the dowels 72 with inserts 76, 78 is accomplished by inserting dowels 72 through the bores 30 within one side beam 116 of doorframe 14. Inserts 76, 78 may be made of any type of material upon which the trainee desires to practice. Inserts 76, 78 may also be of any size or shape suitable for removable attachment to door 12 and doorframe 14.

Dowels 72 do not penetrate door 12. During use, dowels 72 simulate locks within the breach training system 2 which may be breached without causing damage to door 12 or doorframe 14. The number and placement of dowels 72 are variable depending on the desired training. Any dowel 72 that is commercial available may be employed. Any dowel-shaped object may replace dowel 72 without departing from the spirit and scope of the invention.

Referring to FIGS. 1 and 6, during use, door 12 is placed in its conventional "closed" position relative to doorframe 14, and the appropriate dowels 72 are inserted through the bores 30 of side beam 116, until they lie within and are engaged with cylindrical holes 80, 82, respectively, of insert 76 and insert 78. Upon assembly, dowels 72 are not in physical contact with door 12. Upon forced entry of a trainee, the resistance force of dowels 72 simulates that encountered in actual field forced entry training.

Dowels 72 are adapted to fail under predetermined conditions, allowing the trainee to experience different types of breaches. For example, dowels 72 may be adapted to fail at 200 pounds of pressure. Or, they may be adapted to fail at 400 pounds of pressure. The specific purpose for the training will determine the type of dowel 72 employed within the removable means 70 at any given time.

Once the breach has occurred, broken dowels 72 are removed and can be readily replaced allowing re-use of breach training system 2. If the removable means 70 for securing door 12 and doorframe 14 in a coaxial condition is damaged during the breach, it too may be replaced without requiring replacement of the entire breach training system 2.

In another embodiment of breach training system 2, additional restraint means 90 are employed in addition to removable means 70. With reference to the embodiment of breach training system 2 that is depicted in FIG. 1, at least one additional restraint means 90 is employed to make forcible entry more of a challenge for the trainee. Additional restraint means 90 are also used to lock the device in a closed position during transport or storage. Generally, two additional restraint means 90 are employed; however, the number varies depending on the degree of difficulty desired by the trainee. In a specific embodiment of the invention, two additional restraint means 90 are employed. Additional restraint means 90 is a 1"×4" piece of wood in specific embodiments of the invention.

Additional restraint means 90 may be any device that is capable of making swinging of door 12 more difficult to accomplish. Additional restraint means 90 may be wooden blocks that are inserted through and extend between door 12 and doorframe 14. Additional restraint means 90 may be of any size, shape or material of manufacture capable of maintaining the position of door 12 and doorframe 14 in a closed, or coaxial position. In a specific embodiment, breach training system 2 comprises two additional restraint means 90 inserted through and extending between door 12 and doorframe 14, the additional restraint means 90 each comprises a 2"×4" piece of wood.

In an alternative embodiment illustrated in FIG. 5, removable means 70 for securing door 12 and doorframe 14 in a coaxial position comprises a locking mechanism 74. Locking mechanism 74 is attached to insert 76 and insert 78. Generally, and in a specific alternative embodiment of the invention, a lock 40 is embedded into insert 76 that includes a rod 42 adapted to extend through cylindrical hole 80 of insert 76 into cylindrical hole 82 of insert 78. In turn, insert 78 includes a means for engagement 44 of rod 42 within cylindrical hole 82. As used herein, an engaged-position means that rod 42 is extended at least partially into cylindrical hole 82. Consequently, when lock 40 is not in an engaged position, rod 42 is not extended into insert 78. Lock 40 may be any commercially available lock including a dead bolt lock, or a standard lock that includes a small handle for engagement and disengagement.

In the embodiment of the invention depicted in FIG. 5, and in another specific an alternative embodiment of the invention, locking mechanism 74 further comprises a doorknob 75. Doorknob 75 is used along with lock 40 is certain embodiments. Similar to lock 40, doorknob 75 includes a rod that extends through insert 76 into insert 78. Use of a real locking mechanism that includes both lock 40 and doorknob 75 further enhances the training experience, since most field breaches involve locked doors that include both a lock and a doorknob.

Inserts 76, 78 could be made of any type of material upon which the trainee desires to practice. For example, and in a specific embodiment of the invention, if the trainee would like to breach steel doors, insert 76 would comprise steel. In another embodiment of the invention, insert 76 comprises soft wood to simulate doors made of soft woods. In a further embodiment, insert 76 comprises hard wood to simulate doors made of hard wood.

At least one locking mechanism 74 may be employed in the invention. In one embodiment, a plurality of locking mechanisms 74 is employed. Locking mechanism 74 may be any device capable of locking a door. The types of locking mechanisms 74 employed may vary within the same door 12, or may be the same.

It should be noted that the means for securing door 12 and doorframe 14 in a coaxial condition are not mutually exclusive, i.e. more than one means may be employed within a single breach training system 2. As such, in one embodiment of the invention, removable means 70 includes insert 76, insert 78, at least one locking mechanism 74, and at least one wooden dowel 72. In this embodiment, locking mechanism 74 may or may not be in an engaged-position during use.

Prior art devices have legs that project outwardly at a perpendicular angle from the front side of the doorframe. In other words, the legs are straight, causing tripping as breachers approach the door. In addition, prior art devices often have a reinforcement bar that runs between the legs that must be stepped over as one approaches the door. The present invention includes base 150 that avoids these problems.

Base 150 comprises two pairs of legs 102 for engagement with the ground. The two pairs of legs 102 are connected to a bottom portion of side beams 116 of doorframe 14 and positioned parallel to the ground. Legs 102 are perpendicular to doorframe 14 and project outwardly from doorframe 14 at an angle sufficient to stabilize the system when force is asserted against doorframe 14. Legs 102 are also positioned at an angle from one another that does not obstruct front access to door 12. In a specific embodiment of the invention, each leg within the pair of legs 102 is in the range of 100-130 degrees from each other, equidistance from each other about a plane that runs through the center of door 12. This orientation allows a group of trainees to approach the door without tripping over base 150.

Base 150 further includes a central member 120 that connects the two pairs of legs 102. Central member 120 is positioned a sufficient distance under door 12 such that swinging of door 12 is not inhibited in any way. Socket 26 is permanently attached to central member 120, as is shown in FIGS. 1-5. A set of stabilizing beams 122, each having a first end and a second end, the first attached to doorframe 14 and the second end being attached to one leg 102, each in a position that is sufficient to stabilize the system when force is asserted against doorframe 14. A further stabilizing beam 124 is also utilized, as depicted in FIG. 1, for additional stabilization of breach training system 2. Further stabilizing beam 124 is generally extended from leg 102 to stabilizing beam 122. The angle of attachment of stabilizing beam 122 may be any orientation that imparts the desired stability of the system. In one specific embodiment, beam 122 is attached to leg 102 and doorframe 14 at an approximately 45-degree angle.

In specific embodiments of the invention, system 2 further comprises a storm door to simulate breaches at residences. Residential storm doors generally pivot opposite the main door, which may pose an obstacle for professionals attempting entry with equipment. As such, it would be beneficial to provide a dual-swing breach training system that replicates these types of entryways.

In view of the above, it will be seen that the several objects of the invention are achieved and other advantageous results are obtained. As various changes could be made in the above constructions without departing from the spirit and scope of the invention, it is intended that all matter contained in the above description or shown in the accompanying drawings shall be interpreted as illustrative only.

What is claimed is:

1. A dual-swing breach training system comprising:

a. a door comprising a solid perimeter, at least one aperture therein for engagement with a removable strike plate, a brace for removable engagement with the strike plate, at least one aperture therein for retaining a means for securing the door in a coaxial position with a doorframe, the solid perimeter including a pair of cross members and a pair of side members, at least one side member comprising a first and second aperture therein;

b. a doorframe comprising a pair of side beams and a cross beam connecting the two side beams, the doorframe further comprising a holder for at least one means for securing the door in a coaxial position with the doorframe;

c. a base attached to the side beams of the door frame, the base comprising two pairs of legs for engagement with the ground, each pair of legs connected to a bottom portion of the side beams of the doorframe and positioned parallel to the ground and perpendicular to the doorframe and projecting outwardly from the door frame at an angle sufficient to stabilize the system when force is asserted against the doorframe and that does not obstruct access to the door;

d. a first hinge system partially inside the first aperture within the door, the hinge system adapted to allow inward and outward swinging of the door and comprising:

i. a rod having two ends, and ii. a socket attached to the cross beam of the doorframe, whereby the first end of the rod is in contact with the aperture of the door and the second end of the rod is in contact with the socket, e. a second hinge system partially inside the second aperture within the door, the hinge system adapted to allow inward and outward swinging of the door and comprising:

i. a rod having two ends, and ii. a socket attached to the base, whereby the first end of the rod is in contact with the aperture of the door and the second end of the rod is in contact with the socket, and f. a removable means for adjustably securing the door and the doorframe in a coaxial position, the means positioned between the door and the doorframe.

2. The system of claim 1 further comprising a storm door attached to a side beam of the doorframe.

3. The system of claim 1 wherein the removable means for adjustably securing the door and the doorframe in a coaxial position, comprises a first insert and a second insert, each having openings therein for engagement of at least one dowel.

4. The system of claim 1 wherein the removable means for adjustably securing the door and the doorframe in a coaxial position, comprises a first insert and a second insert, each having openings therein, and at least one locking mechanism.

5. The system of claim 3 wherein the at least one dowel is adapted to fail under predetermined conditions.

6. The system of claim 4 wherein the at least one locking mechanism comprises at least one of a lock, doorknob or both.

7. The system of claim 1 wherein the door further comprises two or more openings, each removably filled with an insert comprising at least one material selected from the group consisting of wood, metal, fiberglass, plastic, vinyl, glass, and stone.

8. The system of claim 1 wherein the removable means for adjustably securing the door and the doorframe in a coaxial position, comprises a first insert and a second insert, each having openings therein for engagement of at least one dowel, and further comprises at least one locking mechanism.

9. The system of claim 1 further comprising at least one additional restraint means extending through and between the door and the door frame, the door and the doorframe each comprising openings therein for receiving the additional restraint means.

10. The system of claim 1 wherein the holder comprises a bottom member for engagement with the lower portion of an insert and an upper member that is adapted to encircle the upper portion of the insert.

11. The system of claim 1 further comprising a strike plate in communication with the aperture formed within the door.

12. The system of claim 11 wherein the strike plate comprises a brace permanently connected thereto, at least one pin for engagement with the brace connected to the door, and a means for retaining the pin about the strike plate.

13. The system of claim 12 wherein the strike plate is reversible.

14. The system of claim 12 wherein the strike plate comprises at least one of steel or wood.

15. The system of claim 12 wherein the strike plate comprises removable pins for engagement with a brace attached to the door and a permanent brace for engagement with the door, and at least one handle.

16. A dual-swing breach training system comprising:

a. a door comprising a solid perimeter, a brace for engagement with pins attached to the door, at least one reversible steel strike plate removably embedded within the door, and at least one removable means for adjustably securing the door and the doorframe in a coaxial position partially embedded within the door, the at least one removable means comprising a first insert and a second insert, each having holes therein for engagement of at least one dowel, the solid perimeter comprising a pair of members comprising a pair of apertures therein for engagement with a hinge b. a doorframe comprising a pair of side beams and a cross beam connecting the two side beams, the doorframe further comprising a holder for at least one means for securing the door in a coaxial position with the doorframe;

c. a base attached to the side beams of the door frame, the base comprising two pairs of legs for engagement with the ground, each pair of legs connected to a bottom portion of the side beams of the doorframe and positioned parallel to the ground and perpendicular to the doorframe and projecting outwardly from the door frame at an angle sufficient to stabilize the system when force is asserted against the doorframe and that does not obstruct access to the door;

d. a first hinge system partially inside the first aperture within the door, the hinge system adapted to allow inward and outward swinging of the door and comprising:

i. a rod having two ends, and ii. a socket attached to the cross beam of the doorframe, whereby the first end of the rod is in contact with the aperture of the door and the second end of the rod is in contact with the socket, e. a second hinge system partially inside the second aperture within the door, the hinge system adapted to allow inward and outward swinging of the door and comprising:

i. a rod having two ends, and ii. a socket attached to the base, whereby the first end of the rod is in contact with the aperture of the door and the second end of the rod is in contact with the socket, and f. a removable means for adjustably securing the door and the doorframe in a coaxial position positioned between the door and doorframe, the means comprising a first insert and a second insert, each having holes therein for engagement of at least one dowel.

17. A dual-swing breach training system comprising:

a. a door comprising a solid perimeter, a brace, at least one reversible steel strike plate removably embedded within the door, and at least one removable means for adjustably securing the door and the doorframe in a coaxial position partially embedded within the door, the at least one removable means comprising a first insert and a second insert, each having holes therein for engagement of at least one dowel, the solid perimeter includes a pair of cross members and a pair of side members comprising a pair of apertures therein for engagement with a hinge;

b. a doorframe comprising a pair of side beams and a cross beam connecting the two side beams, the doorframe further comprising a holder for at least one means for securing the door in a coaxial position with the doorframe;

c. a base attached to the side beams of the door frame, the base comprising two pairs of legs for engagement with the ground, each pair of legs connected to a bottom portion of the side beams of the doorframe and positioned parallel to the ground and perpendicular to the doorframe and projecting outwardly from the door frame at an angle sufficient to stabilize the system when force is asserted against the doorframe and that does not obstruct access to the door;

d. a first hinge system partially inside the first aperture within the door, the hinge system adapted to allow inward and outward swinging of the door and comprising:

i. a rod having two ends, and ii. a socket attached to the cross beam of the doorframe, whereby the first end of the rod is in contact with the aperture of the door and the second end of the rod is in contact with the socket, e. a second hinge system partially inside the second aperture within the door, the hinge system adapted to allow inward and outward swinging of the door and comprising:

i. a rod having two ends, and ii. a socket attached to the base, whereby the first end of the rod is in contact with the aperture of the door and the second end of the rod is in contact with the socket, and f. a removable means for adjustably securing the door and the doorframe in a coaxial position positioned between the door and doorframe, the means comprising a first insert and a second insert and a locking mechanism, the locking mechanism comprising at least one of a lock, a doorknob, or both.

* * * * *